United States Patent [19]

Amano et al.

[11] 4,042,908
[45] Aug. 16, 1977

[54] APPARATUS FOR SAFETY AND DETECTION OF ILLUMINATING CIRCUIT

[75] Inventors: Shin Amano, Shizuoka; Takeshi Tanga, Shimizu, both of Japan

[73] Assignee: Koito Seisakusho Co., Ltd., Tokyo, Japan

[21] Appl. No.: 638,270

[22] Filed: Dec. 5, 1975

Related U.S. Application Data

[63] Continuation of Ser. No. 333,843, Feb. 20, 1973, abandoned, which is a continuation of Ser. No. 258,745, June 1, 1972, abandoned, which is a continuation of Ser. No. 23,171, March 27, 1970, abandoned.

[30] Foreign Application Priority Data

| Mar. 28, 1969 | Japan | 44-23347 |
| June 30, 1969 | Japan | 44-51349 |
| June 30, 1969 | Japan | 44-51350 |
| Dec. 3, 1969 | Japan | 44-97718 |

[51] Int. Cl.² .................... G08B 21/00; B60Q 9/00
[52] U.S. Cl. .................................. 340/46; 340/251
[58] Field of Search .............. 340/251, 253 O, 253 B, 340/248 D, 46; 315/82

[56] References Cited

U.S. PATENT DOCUMENTS 3,311,779  3/1967  Hartkorn .......................... 340/251

Primary Examiner—Thomas B. Habecker
Attorney, Agent, or Firm—Watson, Cole, Grindle & Watson

[57] ABSTRACT

In a detection apparatus for determining the operability of lighting circuits, a high frequency oscillator operates at a frequency different from that of the power source for the lighting circuits. An electrical element having a high impedance at the oscillator frequency is connected in series with the lighting circuits. Another electrical element having substantially a constant impedance supplies the oscillator output to a connection point between the first electrical member and the lighting circuits. A detecting circuit determines failure of at least one of the lighting circuits by detecting the presence of a high frequency voltage at the connection point. The detected high frequency voltage is rectified and used to indicate failure of the lighting circuit or circuits.

6 Claims, 22 Drawing Figures

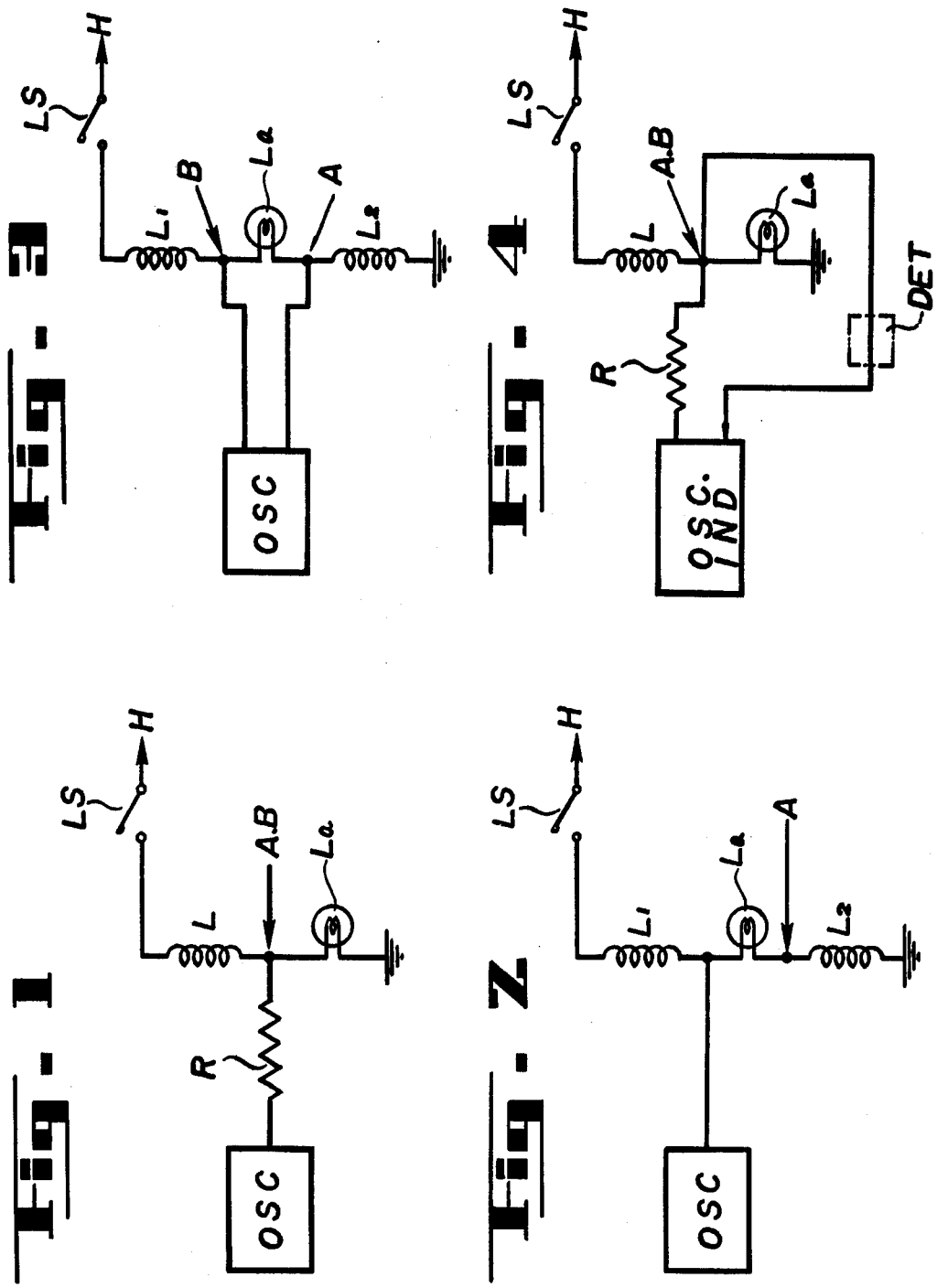

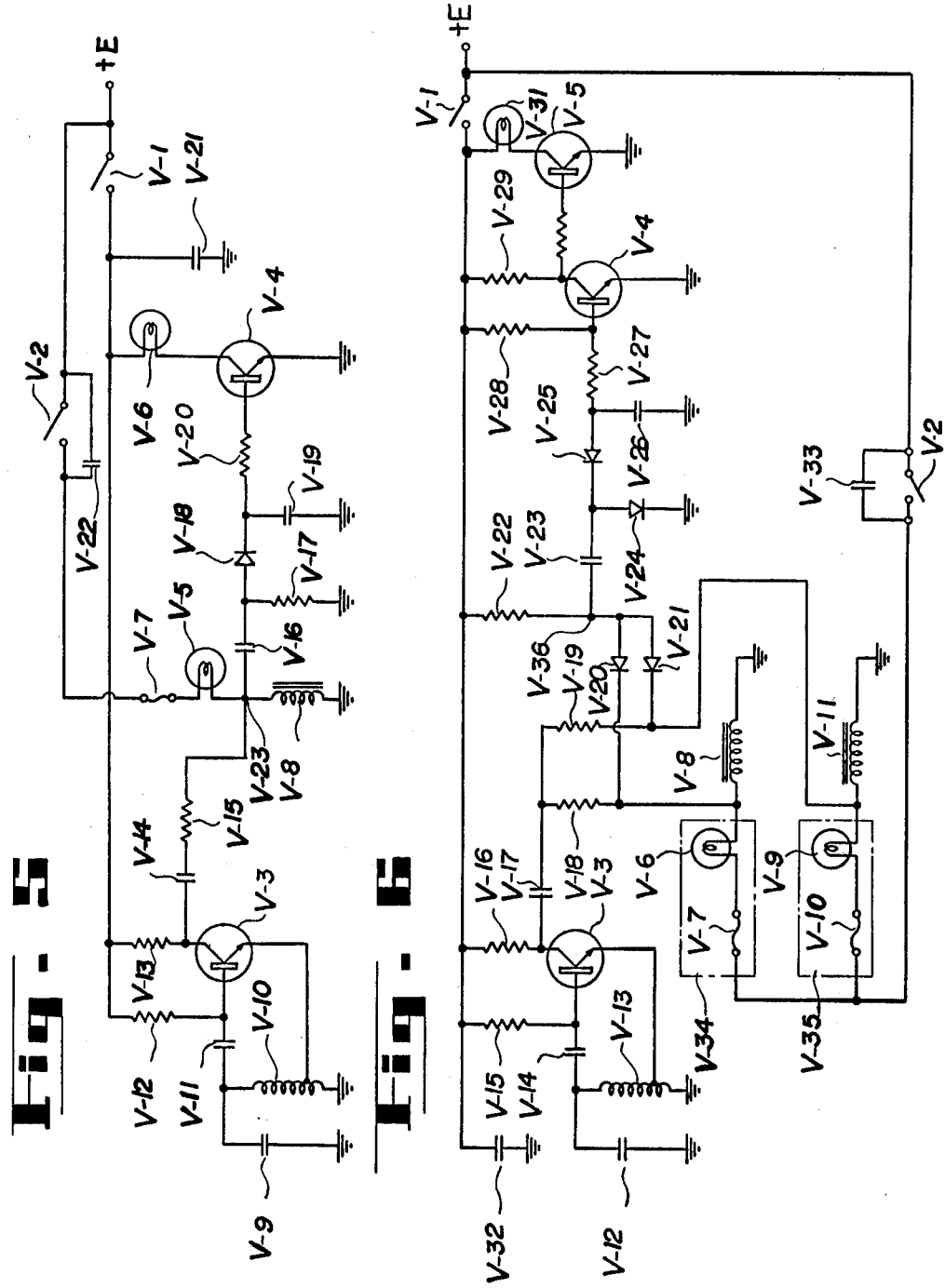

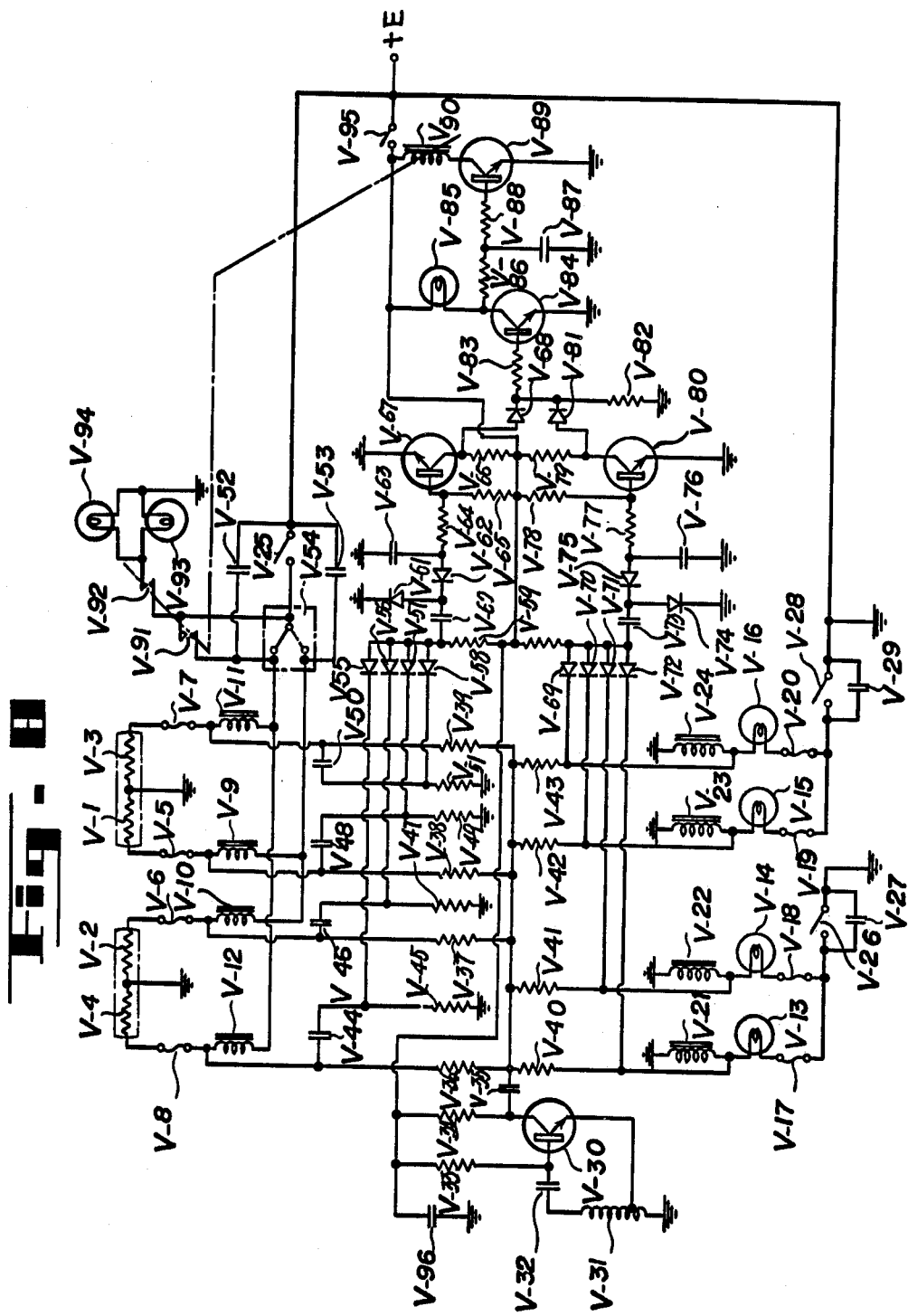

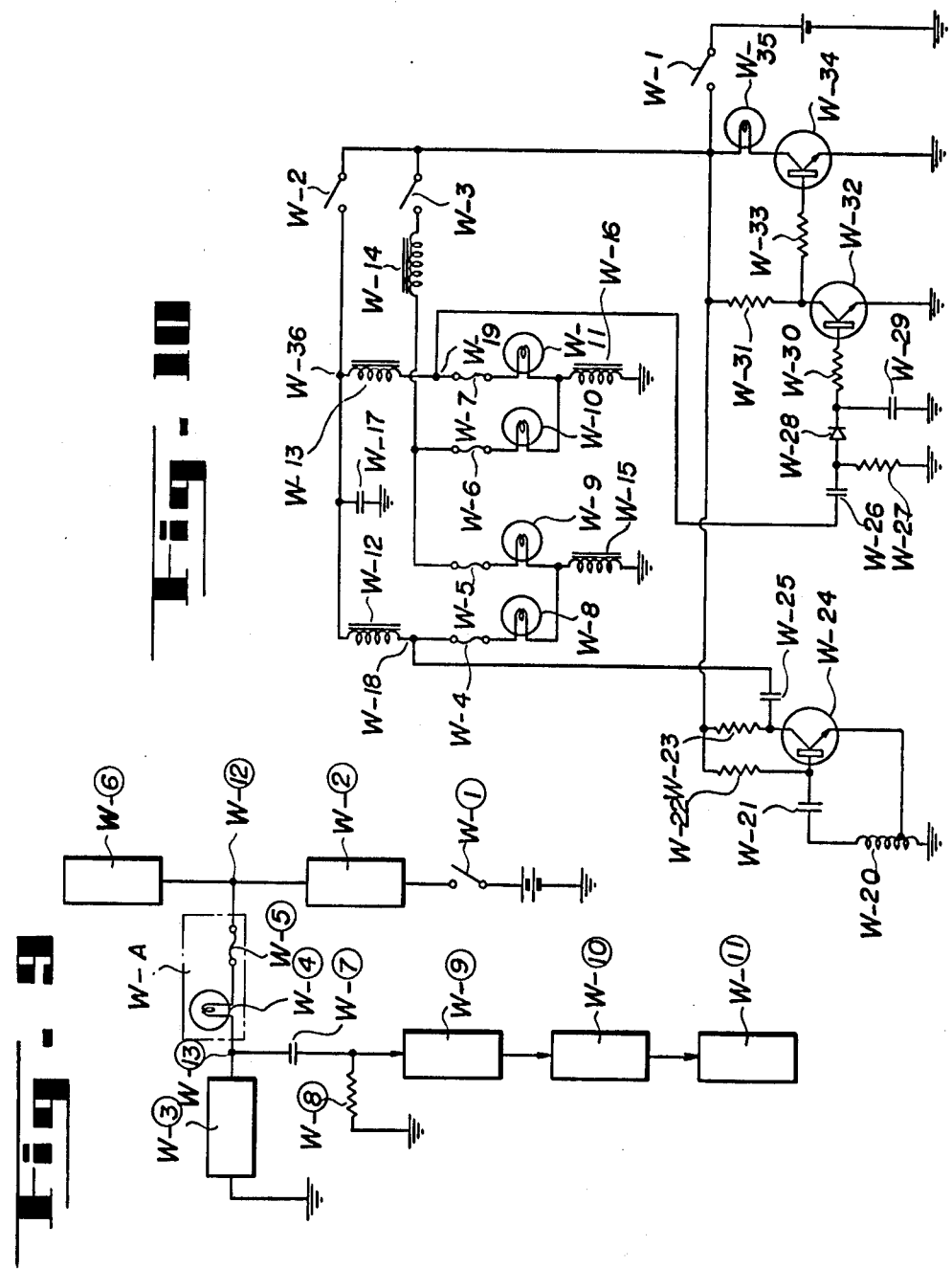

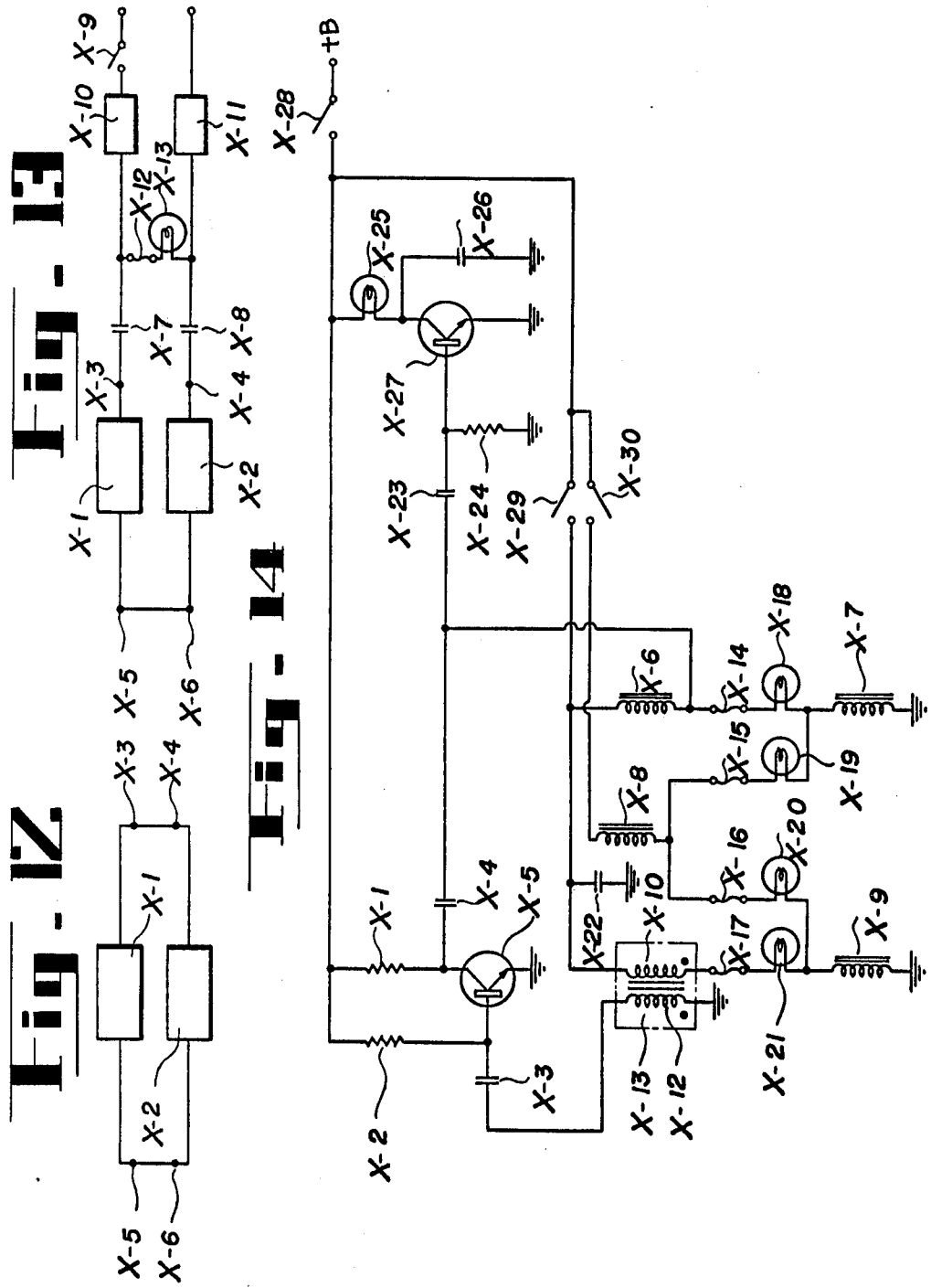

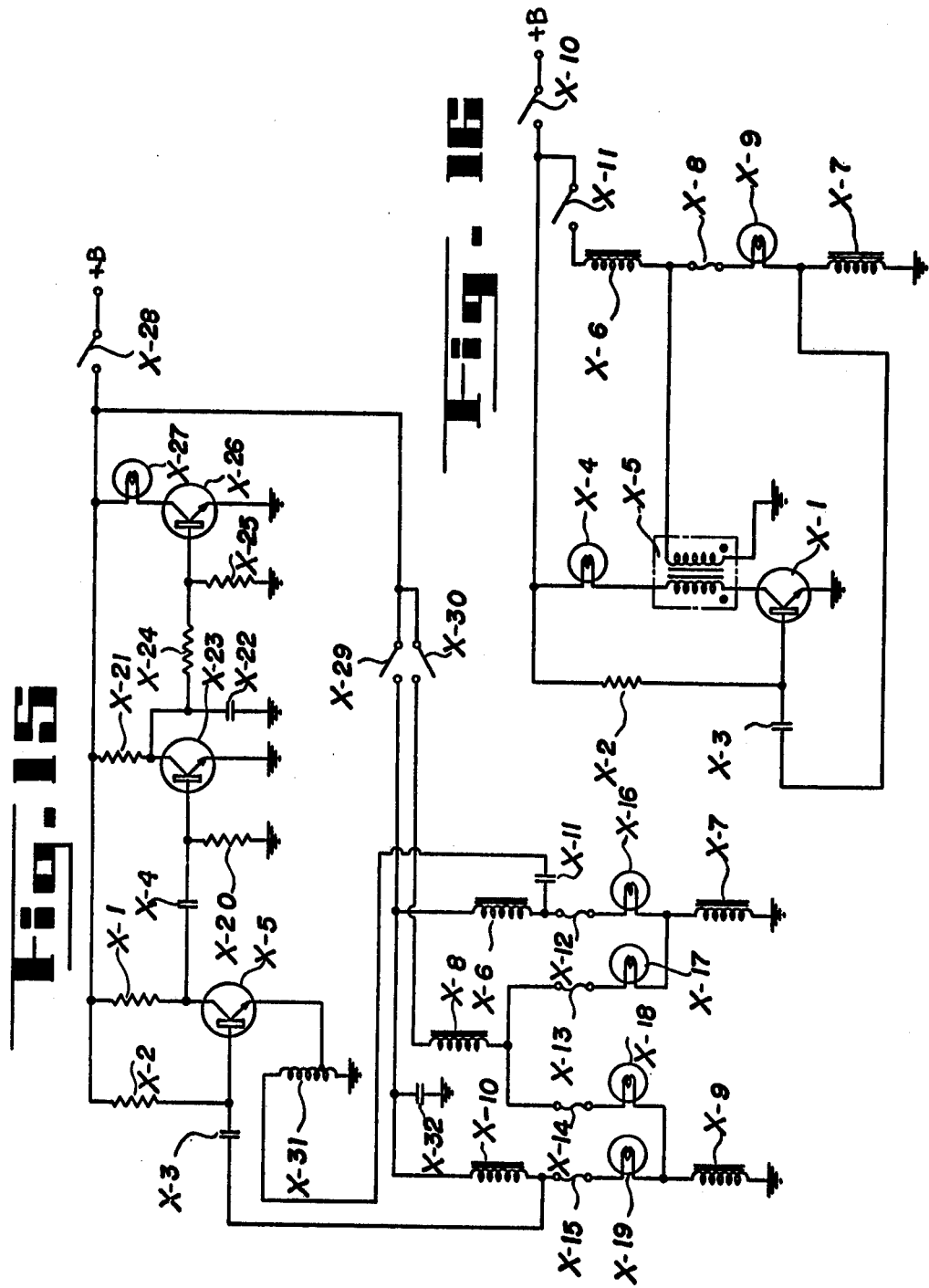

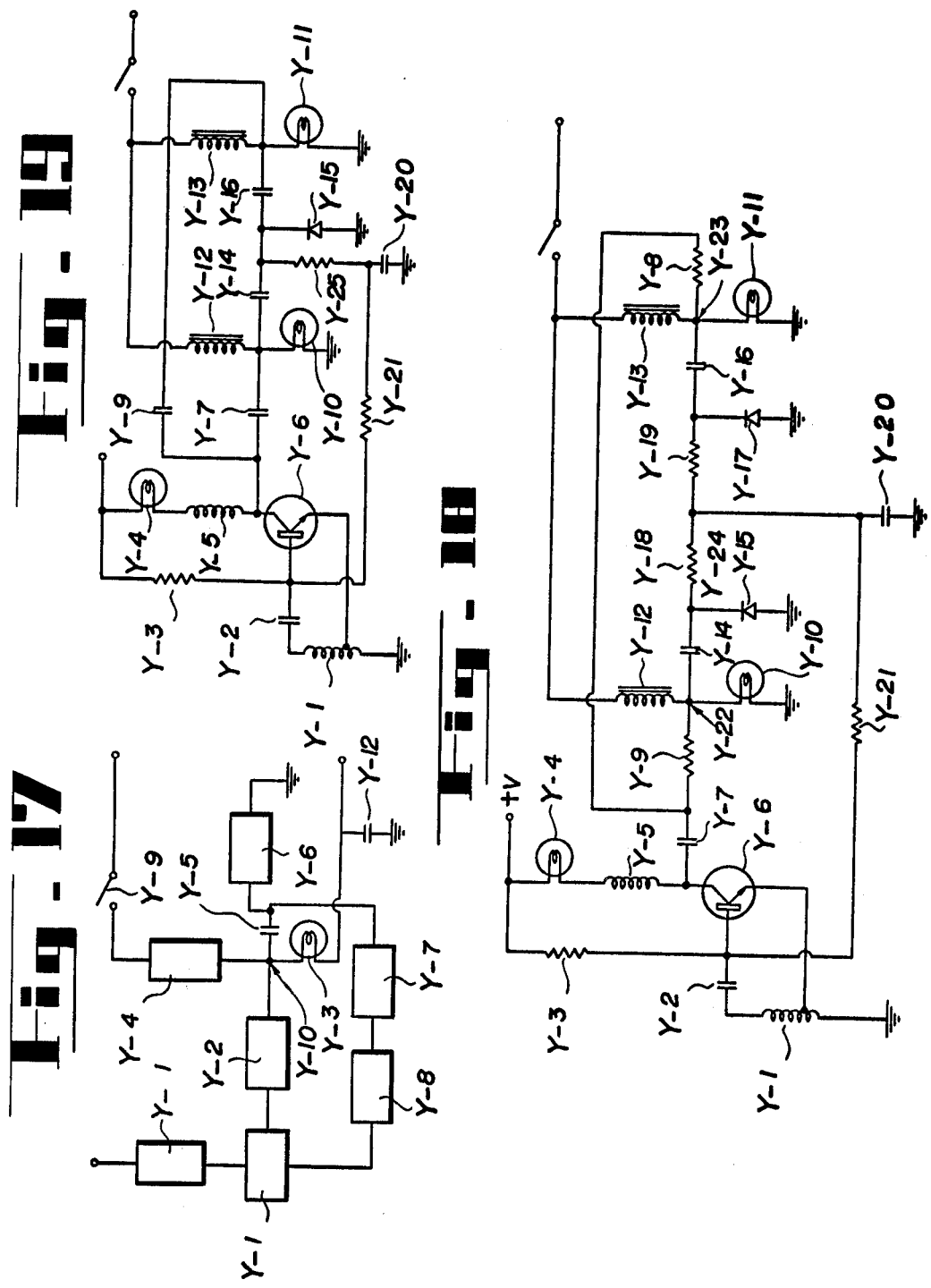

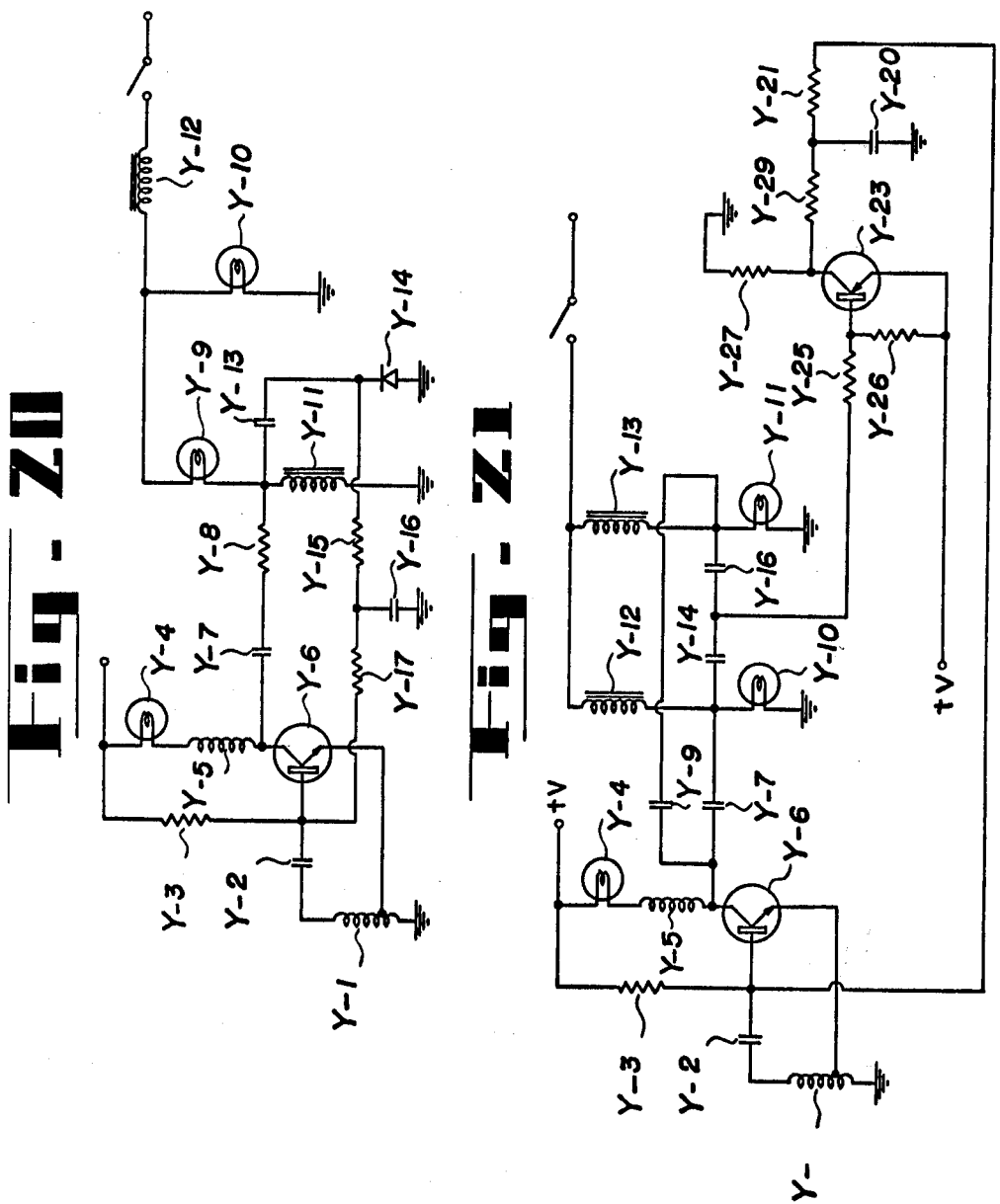

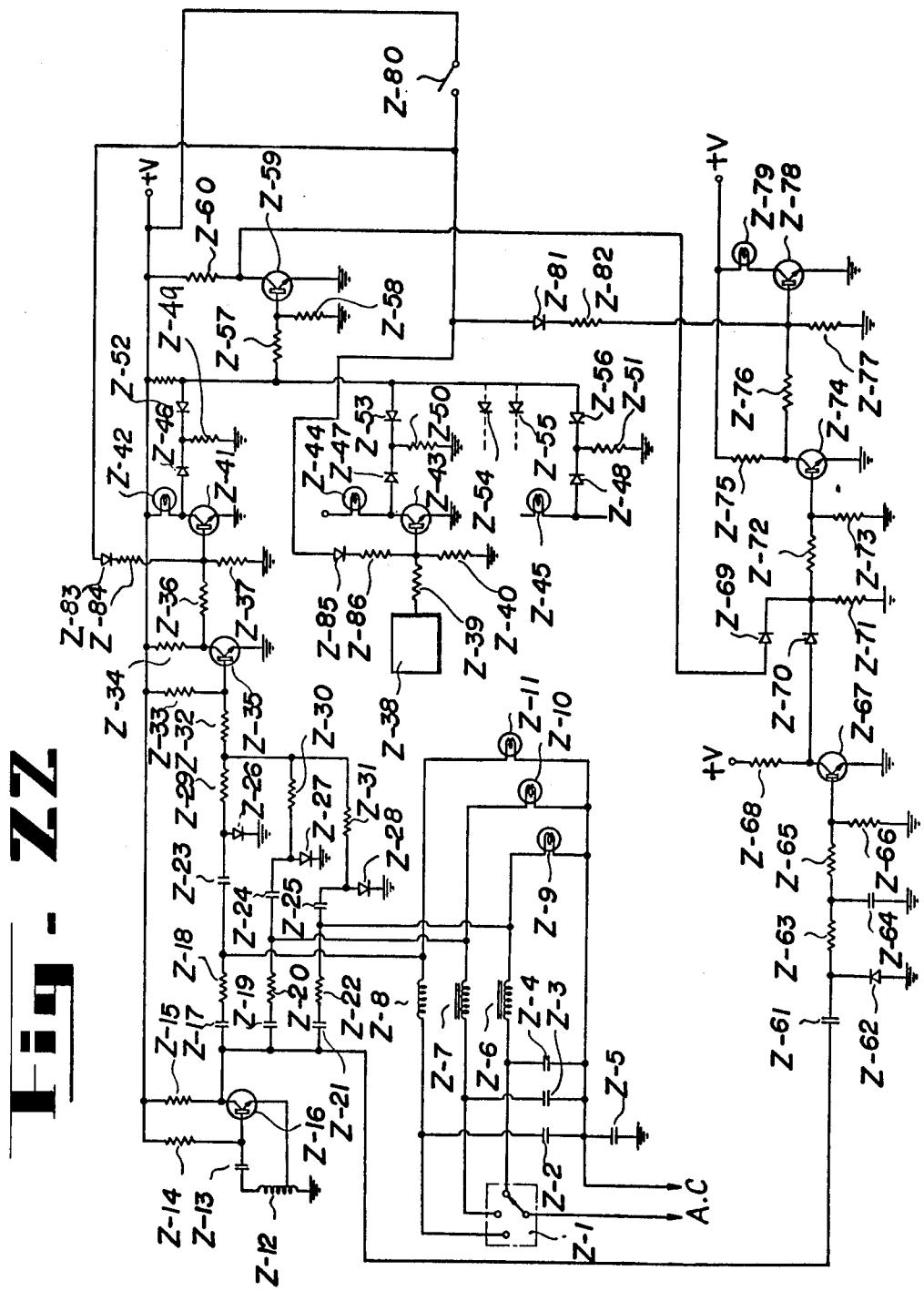
Fig-ZZ

ND DETECTION OF
APPARATUS FOR SAFETY AND DETECTION OF ILLUMINATING CIRCUIT

This is a continuation of application Ser. No. 333,843 filed Feb. 20, 1973, which in turn is a continuation of Ser. No. 258,745, filed June 1, 1972, which in turn is a continuation of Ser. No. 23,171, filed Mar. 27, 1970, all of the above applications having been abandoned.

The accompanying drawings show preferred embodiments of this invention in which:

FIGS. 1 to 4 are schematic diagrams of embodiments of circuits in accordance with this invention;

FIGS. 5 to 8 are schematic diagrams of a circuit embodiment according to this invention;

FIG. 9 is a combination block and schematic diagram of another embodiment of the invention;

FIGS. 10 and 11 illustrate circuitry for carrying out the embodiment shown in FIG. 9;

FIGS. 12 and 13 are block diagrams of another embodiment of the invention;

FIGS. 14 to 16 are schematic diagrams of circuitry for performing the embodiment illustrated in FIGS. 12 and 13;

FIG. 17 is a block diagram of a further embodiment of the invention;

FIGS. 18 to 21 are schematic diagrams of circuitry for performing the embodiment of FIG. 17; and FIG. 22 is a circuit schematic of yet another embodiment of the present invention.

DETAILED DESCRIPTION OF THE INVENTION

Figure 7:
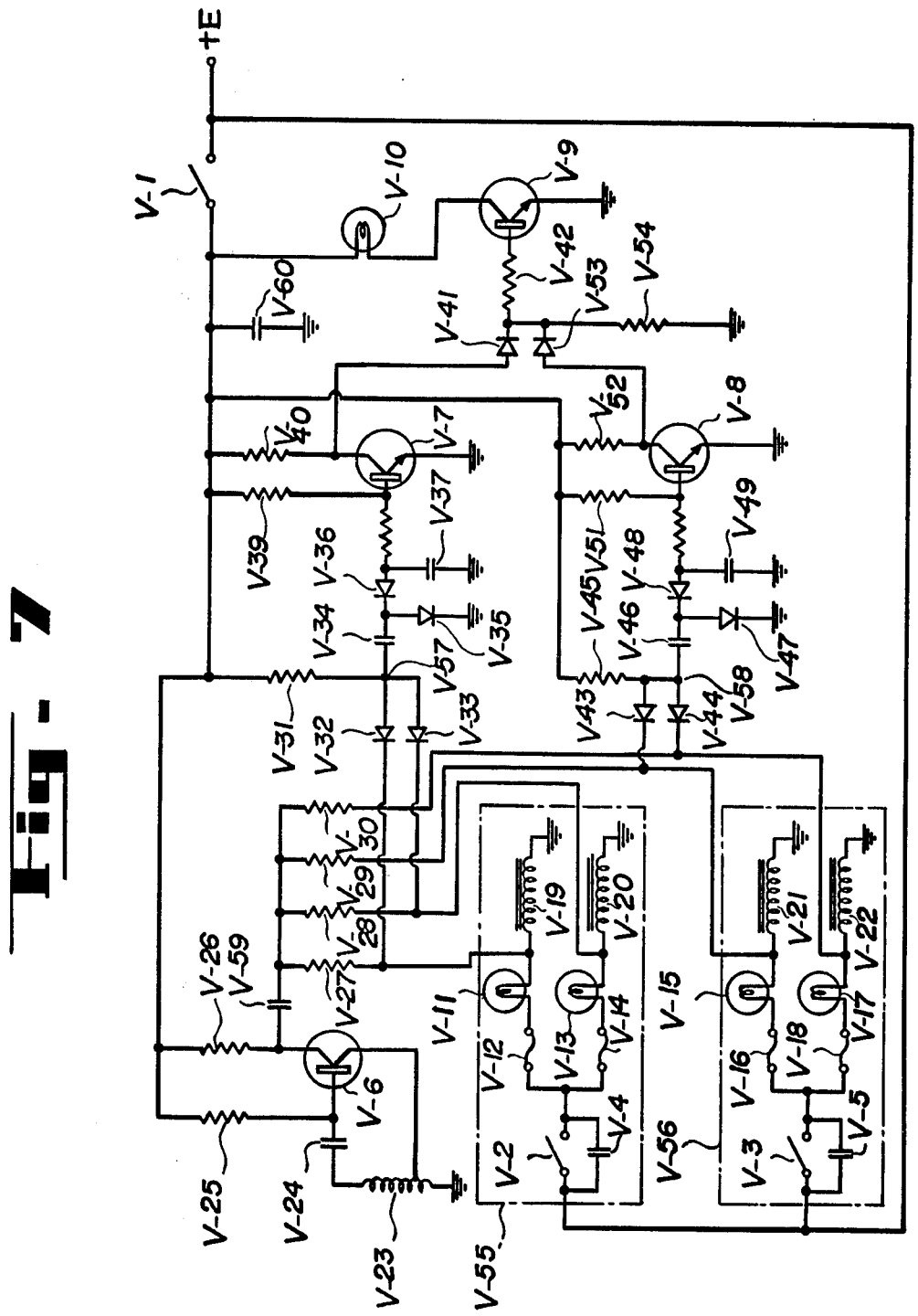

The present invention relates to supervision and safety apparatus and more particularly to such apparatus for lighting circuits used for automobiles and the like.

One of the objects of the present invention is to provide an apparatus for supervising lighting circuits even when said circuits are not lighted. Thus the apparatus according to this invention works to detect any trouble even in daytime or any time when the light is not needed. Accordingly, every counter-measure to prevent accidents may be rapidly taken so as to ensure safe traffic.

Another object of this invention is to provide safer alarm and supervisory apparatus than prior art apparatus, while using fewer indicator and alarm devices. In prior art systems, the number of display lamps, or indicators, increased in accordance with the increase in the number of supervised circuits, which represented an inconvenience to the driver in observing the plurality of indicators. Further, prior art single display lamps for a plurality of supervised circuits were inadequate since a failure in the alarm circuit removed the means of supervision. Accordingly, in accordance with this invention fewer indicator devices are employed than the circuits which are supervised, representing a more convenient system than with similar prior art systems.

Still another object of this invention is that not only a supervisory apparatus is provided so as to operate an indicator such as a display lamp, a buzzer, and so on, to attract the driver's attention when the supervised lighting circuit is inoperative, but also a safety apparatus is provided for special lighting circuits, so that the other lighting circuit can operated to said special circuits, when the special circuits are inoperative. To said special lighting circuits is added a safety apparatus which, when the special circuits are inoperative, automatically drives another lighting circuit by using a relay or a transistor, or other suitable device, as well as lighting or flashing a display lamp. When a head-light circuit of an automobile is inoperative, the driver in the on-coming car may mistake the width of the affected car, which is naturally very dangerous. In such a case, an alternate head-lamp can be automatically lighted. If a running beam circuit is inoperative, a pass-by beam circuit is automatically lighted, and if a pass-by beam circuit is inoperative, a running beam is weakly lighted.

Generally, lighted or not, a lighting circuit presents a high impedance if it is in normal condition, but if it is in an abnormal condition, such as a filament burn-out, bad contact and the like, the circuit is opened and the impedance is infinite.

The present invention bases it principles of operation on the above-mentioned impedance change which is measured by utilizing a high frequency signal to detect any trouble in lighting circuits and an indication of the fault or abnormality is displayed, thus providing better safety.

The apparatus according to the invention is characterized by circuits comprising lighting lamp circuits, a high frequency oscillator and elements such as choke coils, inductances and so on which show high impedance at the oscillator frequency, while showing low impedance at the frequency (direct current is included) of the power source of said lighting lamp. Said elements are connected in series with the "hot" terminal of the power source of said lighting lamp, or between the "hot" terminal and ground of said lighting circuit. A signal supply point of said high-frequency oscillator is connected between the lighting lamp and the element interposed in the power circuit of the lighting lamp. A trouble signal detection point is provided at a suitable connection in said lighting circuit. This invention contemplates the use of semiconductor elements and solid-state components. Now four representative embodiments of the apparatus according to this invention are illustrated in FIGS. 1 to 4. In FIGS. 1 to 4, reference A designates a detection point of a trouble signal, B is a signal supply point from a high-frequency oscillator, La is a lamp, OSC is a high-frequency oscillator, LS is a lighting switch, and H is a power source. L, L1 and L2 are inductors which present high impedance at the frequency of a high-frequency oscillator while showing low impedance at the low frequency (direct current included) of the power source of a lighting lamp. R is a resistance, OSC.IND is high-frequency oscillator which also is an indicator, and DET is a wave-detector. The embodiment of FIG. 1 is characterized by an inductor L, which shows high impedance at the oscillator frequency by a high-frequency oscillator and is connected in series with a lighting circuit. Any fault in the lighting circuit is detected by whether high-frequency voltage is produced at point A or not. In this apparatus, inductor L is connected in series between the lighting lamp and its power source and a signal supply point from a high-frequency oscillator and a detection point B to detect a signal when there is a fault in the lamp circuit are connected at the same point.

The embodiment of FIG. 2 is characterized by inductors L1 and L2, which show high impedance at the oscillator frequency are interposed in series between the power source and ground of the lighting lamp circuit. Signal supply point B from a high-frequency oscillator is connected between the lighting lamp and inductor L1, while trouble signal detection point A is provided between the lighting lamp and inductor L2, connected with ground of the lamp; and any trouble in the lighting circuit is detected by high-frequency voltage produced at the point A.

The embodiment of FIG. 3 is characterized by inductors L1 and L2, which show high impedance at the oscillator frequency, connected with the power source and with the ground of a lighting lamp, respectively. This lighting circuit is designed to be used as a part of a high-frequency oscillator, the oscillator oscillates when the circuit is in a normal condition, and stops oscillating when the circuit has a fault. In this type apparatus, a signal supply point B from a high-frequency oscillator, and a trouble signal detection point A are connected between a lighting lamp and an inductor L1, and between the lamp and an inductor L2, respectively.

The embodiment of FIG. 4 is characterized by an indicator L having high impedance at the oscillator frequency and connected in series between a lighting lamp and the power source. High frequency voltage at the signal supply point A is wave-detected, smoothed, and then fed back to said oscillator so as to operate an indicator therein when there is a fault in the lighting circuit.

The embodiment of FIG. 22 is characterized in that it indicates if a supervised lighting circuit apparatus works normally or not, as well as to indicate if the supervisory lighting circuit is or is not operating normally. Many incandescent lamps may be used in supervisory lighting circuits, as illustrated in FIGS. 1–4, to warn drivers of trouble. Consequently, means are needed to conform if the indicators, such as display lamps themselves are working normally or not, and also if the indicator circuit is working normally or not. The circuit embodiment of FIG. 22 provides such functions.

A preferred embodiment of the type illustrated in FIG. 1 is shown in FIGS. 5–8. A high-frequency choke coil or an inductance is connected in series with a circuit. Their common connection is supplied with high frequency voltage from a high frequency oscillator through a resistance or like device having a certain impedance. Both the high-frequency choke coil and the inductance have high impedance at the oscillator frequency. Since the direct current resistance of the high frequency choke coil is small, the direct current voltage drop across the choke coil during the lighting of the supervised circuit is negligibly small, and the lighting circuit is, therefore, not affected.

With respect to high frequency, the supervised circuit and the choke coil are connected in parallel, and the supervised circuit has low impedance at the oscillator frequency. If the impedance of the choke coil is high, then, when the supervised circuit is in a normal condition, high frequency coltage is divided by the resistance and the supervised circuit having high impedance. Thus, high-frequency voltage is reduced to zero or an extremely small value at the connection point of the supervised circuit and the choke coil. When the supervised circuit has a fault, for example, burn-out of a lamp filament or of a fuse, high-frequency voltage is divided by the open circuit impedance of the burned-out element and the high-impedance choke coil and high frequency voltage is produced at the connection point. Accordingly, the presence or absence of a fault in the supervised circuit is determined by whether high-frequency output is or is not produced at the connection point between the supervised circuit and the choke coil.

Furthermore, when the supervised lighting circuit is not on, for example, when the lighting switch is open, a fault can be detected as described above by by-passing the switch with a condenser which is of sufficiently low impedance at the oscillator frequency.

FIG. 5 shows a single display lamp used for a single supervised circuit. When supervisory switch V-1 is turned on, transistor V-3 oscillates with a frequency as set by inductance V-10 and condenser V-9, high frequency voltage is produced at load resistance V-13 of the transistor V-3. The supervised circuit and oscillator are connected by condenser V-14, and the high frequency voltage is supplied to the supervised circuit through resistance V-15.

In the supervised circuit, a lighting switch V-2 which is by-passed by condenser V-22 having sufficiently low impedance at the oscillator frequency, fuse V-7, supervised lamp V-5, a choke coil or inductance V-8 are all connected in series. If supervised lamp V-5 and the fuse V-7 are at their normal condition and the lighting switch V-2 is closed, namely, when the lamp V-5 is normally lighted, lamp V-5 and the fuse V-7 have a low impedance at the oscillator frequency. And, if condenser V-21, which is connected between the power source and ground, is selected to also have sufficiently low impedance at the oscillator frequency, then high frequency voltage is not produced at the connection V-23. If the lamp V-5 and the fuse V-7 are at normal condition and the lighting switch V-2 is opened, namely, when the light is off, lamp V-5, the fuse V-7 and condensers V-22, V-21, have low impedance at said oscillator frequency. Therefore, high frequency voltage in not produced at the connection point V-23 just as when switch V-2 is closed. Accordingly, the base of transistor V-4 is almost at zero potential, and transister V-4 is not conducting display lamp V-6 and display lamp V-6 is not lighted.

However, if the supervised circuit has a fault, for example, if the supervised lamp V-5 is disconnected or the example, if the supervised lamp V-5 is disconnected or the fuse V-7 is fused, the choke coil or the impedance V-8 is connected between V-23 and ground. By selecting choke coil V-8 to have high impedance at the oscillator frequency, high frequency voltage from the oscillator is divided by resistance V-15 and choke coil V-8, and thus high frequency voltage is produced at the connection V-23. Accordingly, in order to obtain large output voltage when the circuit has a fault, the impedance of the choke coil V-8 should be raised. But in so doing, a voltage drop occurs equal to the direct current resistance of choke coil V-8 when the lamp V-5 is normally lighted, the lamp terminal voltage is therefore reduced and lamp V-5 is not lighted. Therefore, oscillator frequency should be raised to increase the impedance of choke coil V-8.

A condenser V-16 is used to isolate direct current and to pass only high frequency voltage. This high frequency voltage is half wave-detected by diode V-18 and rectified by condenser V-19. Transistor base V-4 rises to a plust potential, and the conduction of transistor V-4 lights display lamp V-6. Flashing of display lamp V-6, when the supervised curcuit has a fault can be effected by intermittent high frequency oscillation with a predetermined time constant by means of resistance V-12 and condenser V-11.

FIG. 6 illustrates a modification wherein the supervision of two circuit is effected with a single display lamp. As in FIG. 5, when switch V-1 is turned on, transistor V-3' oscillates with a high frequency, condenser V-17' passes the high frequency voltage, resistances V-18' and V-19' are connected in parallel in relation to the oscillator, and diodes V-20', V-21' and resistance V-22' form an OR circuit. Thus high frequency voltage is produced at the OR output end V-36' when one or both of the supervised circuits V-34' and V-35' have a fault. Resistance V-22' provides a direct current bias for diodes V-20' and V-21' to raise their wave-detection efficiency. Since direct current is provided at the OR output end V-36' by the resistance V-22', condenser V-23' isolates the direct current and passes high frequency voltage. The high frequency boltage is wave-detected by diode V-25' and rectified by condenser V-26'. If the supervised circuits are in normal condition, transsistor V-4' conducts through resistance V-28'. Consequently, transistor V-5' is interrupted and display lamp V-31' is not lighted. If one or both of supervised circuits V-34' and V-35' have a fault, the base potential of transistor V-4 is lowered, and it ceases to conduct. Consequently, transister V-5' conducts, and display lamp V-31' is lighted. Flashing of display lamp V-31', if there is a fault, can be effected by intermittent oscillation with a predetermined time constant by means of a suitably selected resistance V-15' and condenser V-14'.

FIG. 7 illustrates an embodiment in which a single display lamp is provided for two kinds of supervised circuits, each function of which is different fro the other. When one of said circuits has a fault, the display lamp is lighted. While if the other circuit has a fault, then, the display lamp flashes. Each function of the two supervised circuits is, for convenience, designated as function A and function B, respectively. Transistor V-6'' intermittently oscillates by means of resistance V-25'', condenser V-24'' and inductance V-23''.

If one or more circuits of a supervised circuit group V-55 having function A has a fault, high frequency intermittent output is produced at Or output end V-57, and wave-detected by a diode V-36. Condenser V-37 has the capacity to smooth said intermittent output sufficiently, transistor V-7 is interrupted. Transistor V-9 conducts because the voltage at the collector of transistor V-7 rises and the base of transistor V-9 is raised via diode V-41 and resistance V-42, thereby lighting display lamp V-10.

If one or more circuits of supervised circuit group V-56 having function B has a fault, high frequency intermittent output is produced at V-58 through the OR gate formed by diodes V-43, V-44 and resistance V-43. Condenser V-49 is suitably selected to rectify high frequency and not to smooth the intermittent frequency, non-conduction and conduction cycles of transistor V-8 is repeated with an interval of an oscillation cycle, and a rectangular wave output is obtained from the collector of transistor V-8. The rectangular wave passes through the OR circuit formed by diode V-53 and resistance V-54 to transistor V-9, and thus display lamp V-10 is flashed.

The embodiment of FIG. 8 is a modification of the one shown in FIG. 7. This circuit is characterized in that when a head light or its fuse has a fault, a display lamp is lighted. When the head light is lighted, and the running filament of dual head lights, or the corresponding fuse is disconnected, a passing beam, and the other lamp is automatically lighted. When a passing filament or the corresponding fuse has a fault, the other lamp is automatically lighted. When a supervised circuit other than the head light has a fault, the display lamp is flashed.

Reference designations V-1'''' and V-2''' are running filaments dual head lights for two head lights V-3''', and V-4''' are the passing filament, V-5''', V-6''', V-7''' and V-8''' are the corresponding fuses, and V-9''', V-10''', V-11''', V-12''' are the corresponding choke coils. If safety apparatus switch V-95 is turned on, transistor V-30 oscillates intermittently with a high frequency determined by resistance V-33''', coil V-31''' and condenser V-32''' and the high frequency voltage is fed by condenser 35 through resistances V-36''', V-37''', V-38'''' and V-39''' into the head light circuits. High frequency intermittent voltage, which is produced when there is a fault, is passed by condenser V-14''', resistances V-45''', V-47''', V-49''', V-51''' and condensers V-46''', V-48'''' and V-50'''. The OR output of diodes V-55'''' to V-58''' is removed of its direct current by condenser V-60''', and is wave-detected by diode V-62''' and smoothed and rectified by condenser V-63'''. Thus transister V-62 is operated. If the head light circuits are in a normal condition, transistor V-67 conducts through a resistance V-65; transistor V-84 is, therefore, interrupted and thus display lamp V-85 is not lighted. Transistor V-89 conducts and operates relay V-90, and its contacts V-91 and V-92 are opened. Even if head light switch V-25''' is opened, and condensers V-52''' and V-55''' are selected to have a sufficiently low impedance at the oscillator frequency, then a fault can be detected independently of the state of head light switch V-25'''. Condenser V-63 is selected to have sufficient capacity to smooth the intermittent frequency, then, transistor V-67 is interrupted when the circuit has a fault. Transistor V-84, therefore, conducts and display lamp V-85 is lighted. Relay V-90 is released and thus relay contacts V-91 and V-92 are closed. Accordingly, if a running beam fault occurs when the running beam is lighted, then contact V-92 is closed and the other lamp V-93 and V-94 are lighted. If a passing beam fault occurs when the passing beam is lighted, then the other lamps V-93 and V-94 are lighted. Thus the on-coming car driver will not have occasion to mistake the car width.

If a supervised circuit other than a head light circuit has a fault, namely, one or more among supervised lamps V-13''', V-14''', Vx-15''', V-16''' and the corresponding fuses V-17, V-18, V-19, V-20 have a fault, then, high frequency V-69, V-70, V-71 and V-72. Condenser V-76 does not have the capacity to be able to smooth the intermittent oscillated frequency, then, interrupting and conducting cycles of transistor V-80 are repeated, and thus display lamp V-85 is flashed. The intermittent frequency is smoothed by resistance V-86 and condenser V-87, the base of transistor V-89 reaches plus-potential even though another supervised circuit has a fault, and transistor V-89 conducts. Accordingly, relay V-90 is kept closed. The relay V-90 is released only if a head light circuit has a fault, and the relay contact V-92 is closed. It is evident that, in the above-described embodiments, the display lamp can be replaced by any other suitable indicators, such as a buzzer.

The aforedescribed safely apparatus for lighting circuits have the following advantages:

1. Only high-frequency choke coils are needed to be inserted in series into the supervised lighting circuit, and therefore only a negligible voltage drop occurs when a lamp is normally lighted.

2. Since high-frequency voltage is used, supervision is effected even in daytime or when no lighting is needed, by by-passing a switch of the supervised lighting circuit with a condenser which has sufficiently low impedance at the high frequency.

3. Since there is no mechanical contact point between the supervision stage and the detection stage, misoperation by vibration may be avoided.

4. Supervision of a plurality of supervisory circuits may be achieved by supplying the oscillator output into a plurality of the supervised circuits connected in parallel.

5. A single supervisory circuit may have a single display lamp and a plurality of supervisory circuits may also jointly have a single display lamp.

6. Repair of faulty lighting circuit, does not affect the other lighting circuits which remain operative.

7. A display lamp may be arranged to be both flashed and lighted continuously during a fault. Therefore, a single display lamp may be used to supervise circuits having different functions from one another.

The embodiment disclosed in FIGS. 9 and 10 bases its principle on the fact that high-frequency current can be provided directly into a supervised circuit. Further, electrical elements having high impedance at the supervisory frequency used are connected between the supervised lighting circuit and both poles of the power source. Suitable electrical elements, for example, a high frequency choke coil, an inductance, a parallel resonance circuit, etc. One end of the supervised lighting circuit is supplied with high frequency voltage from a high frequency oscillator, and the other end provides an output. If the supervised circuit is in a normal condition, high frequency current flows in said circuit, and high frequency voltage is produced at its output independently of the on-off state of the supervised circuit. But if said circuit has a fault, by such reason as, for example, burn-out of the supervised lamp, fusing of the corresponding fuse, bad contact or so on, no high frequency voltage is produced at the output end. Accordingly, the supervised circuit can be judged to be normal or not by whether high frequency voltage is or is not produced at the output end. Thus, with the signal indicators indicating a fault to the driver, another lighting circuit may be operated.

With respect to FIG. 9, wherein a single supervised circuit is illustrated, electrical elements W-2 and W-3 are connected between the supervised lighting circuit A, comprising a supervised lamp W-4 and a corresponding fuse W-5, and both poles of the power source, respectively. The electrical elements have low impedance at the frequency (in this case direct current) of the power source of the supervised lighting circuit, and high impedance at high frequency. A connection W-12 is provided at the output of an intermittent or continuous high frequency oscillator W-6. Independently of the opened or closed state of the supervised lighting switch W-1, if supervised lighting circuit A is in normal condition, high frequency current from said oscillator W-6 flows through a fuse W-5, a supervised lamp W-4, a condenser W-7 and a resistance W-8, and a high frequency voltage drop is produced across resistance W-8. Under these conditions, an indicator operating circuit W-11 is arranged so as not to be operated.

However, if the supervised circuit has a fault, for example, by such reason as burn-out of the lamp W-4 or fusing of the fuse W-5, high frequency current does not flow through the resistance W-8. Accordingly, no wave-detection output is produced by wave-detector W-9 and by means of exciter W-10, indicator operating circuit is operated so as to give warning to the driver.

FIG. 10 illustrates supervision of four lamp circuits. A supervised circuit comprises supervised lamps W-8', W-9', W-10', W-11' and their corresponding fuses W-4', W-5', W-6', W-7'. Choke coils W-12', W-13', W-14', W-15' and W-16' are connected as shown in FIG. 10. When supervisory circuit switch W-1' is closed, transistor W-24' oscillates with the frequency set by inductance W-20', resistance W-22' and condenser W-21'. Resistance W-23' is small so as to lower the output impedance of the oscillator as much as possible, and choke coil W-12' is connected to the oscillator output through condenser W-25 at point W-18'.

When the supervised circuit is in a normal condition, high frequency current flows through fuse W-4', supervised lamps W-8', W-9', fuses W-5', W-6', supervised lamps W-10', W-11', fuse W-7', condenser W-26' and resistance W-27'. High frequency voltage is produced across resistance W-27'. This voltage is wave-detected by diode W-28', smoothed by condenser W-29' and, through resistance W-30', supplied to the base of transistor W-32'. Transistor W-32' conducts and its collector potential reaches nearly ground potential, so that, transistor W-34' is interrupted and display lamp W-35' is not lighted.

When the supervised circuit has a fault, the filament of a lamp W-8' is burned out, for example, the high frequency current does not flow to resistance W-27', and the transistor W-32 is interrupted, its collector potential reaches nearly the power source potential and accordingly, transistor W-34' conducts and a display lamp W-35' is lighted.

Similar to the above-described operation, a display lamp may be also lighted by other kinds of faults or faults on more than two of the supervised circuits. Flashing of a display lamp, when the supervised lighting circuit has a fault, can be achieved by selecting a resistance W-22' and a condenser W-21', and to generate an intermittent oscillation of transistor W-24'. Terminal W-36' of condenser W-17' is grounded, thereby preventing the high frequency voltage from leaking through choke coils W-12' and W-13' to terminal W-19', when the supervised lighting circuit has a fault.

It is apparent that the aforedescribed apparatus may be modified to supervise any number of lighting circuits.

Figure 11:
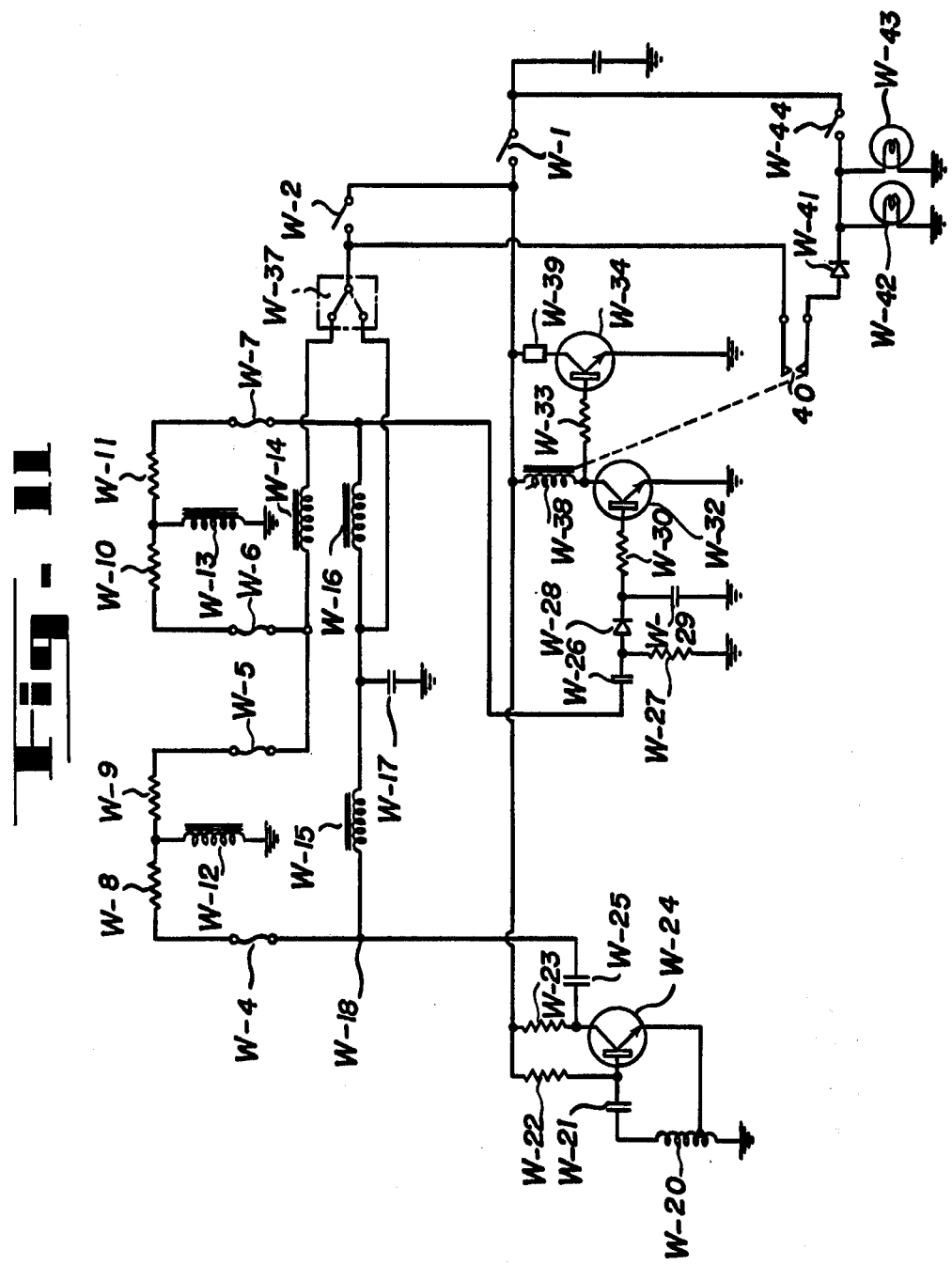

FIG. 11 shows another embodiment of safety apparatus for a head light circuit. This apparatus also includes an indicator operated to signal the driver when a head light circuit has a fault. Furthermore, this circuit operates so that another lamp is automatically lighted in case of a fault in the head light.

References W-8' and W-11' designate the passing filaments of two head lights, and, W-9' and W-10' are running filaments of two head lights. The circuit in FIG. 11 operates to detect a fault in the same manner as the circuit of FIG. 10. If a head light circuit is in a normal condition, transistor W-22' is conductive independently of the opened or closed state of lighting switch W-2'. Since contact W-40' of relay W-38' is opened, other lamps W-42' and W-43' are not lighted, and transistor W-34' is interrupted. Thus indicator W-39' is not operated. However, if the circuit has a fault, transistor W-32' is interrupted, contact W-40' of relay W-38' is closed, and through diode W-41', the other lamps W-42' and W-43' are lighted and the indicator W-39 also is operated. Numeric reference W-41' is a hand switch of the other lamp.

The apparatus shown in FIGS. 9–11 has the following advantages in addition to the previously mentioned advantages numbered 3, 5 and 6:

1. The low impedance of the electrical elements connected between the supervised lighting circuit and the power source, at low signal frequencies or the frequency of the power source, results in negligible voltage drops. Yet, these electrical elements have high impedance at the oscillator frequency, thereby enabling the circuits to detect a fault.

2. Fault detection is effected by directing high frequency current directly into the supervised circuit and, accordingly, the detection process is simplified. The S/N can be made sufficiently large to enhance the circuit operation.

3. A plurality of supervised circuits are provided by connecting them in series in relation to the high frequency oscillator output.

4. An indicator can be arranged to be operated continuously or intermittently if the circuit has a fault. Furthermore, an indicator can also be arranged to operate if the circuit is in a normal condition, and not to operate if the circuit has a fault.

5. Since the apparatus may use semiconductors, there is very little power consumption.

6. By using this apparatus, another lighting circuit can be automatically operated in place of a faulty lighting circuit.

Additional preferred embodiments of the type of supervisory apparatus illustrated in FIG. 3 are shown in FIGS. 12–16. The application of high frequency in supervisory apparatus has the disadvantage that the oscillator oscillates independently of the circuit fault and there is the danger that high frequency voltage will escape into the output of the circuit by induction. Accordingly, the S/N ratio is lowered. To overcome such drawbacks, a supervised circuit is arranged as a part of a loop of an oscillator, and the oscillator oscillates if the circuit is in normal condition while oscillation stops when there is a fault, thereby simplifying the signal output processing. Because the supervised circuit forms a part of a loop of the oscillator, the supervision may be effected independently if light circuits are or are not conductive.

With respect to FIG. 12, a feedback oscillator comprises an amplifier X-1 and a feedback circuit X-2, and the supervised lighting circuit is interposed between terminals X-3 and X-4 or between terminals X-5 and X-6. The oscillator will oscillate if the supervised circuit is in a normal condition, while the oscillation stops when a fault occurs and the loop is broken.

In FIG. 13, a supervised circuit comprises fuse X-12 and lamp filament X-13 is interposed between terminals X-3 and X-4 which are the same terminals shown in FIG. 12. Reference X-10 and X-11 are again electrical elements having high impedance at the oscillator frequency, and low impedance at frequency of the power source and may be, for example, an inductance, a choke coil, a parallel resonance circuit, etc. References X-7 and X-8 designate condensers which have low impedance at the oscillator frequency, and high impedance at the frequency of the power source of said circuit. If the supervised circuit is in a normal condition, oscillation occurs since a loop is closed which is formed of amplifier X-1, condenser X-7, fuse X-12, filament X-13, condenser X-8 and feed-back circuit X-2. If there is an abnormal condition such as fusing of fuse X-12 or burn-out of filament X-13, oscillation stops since the loop is cut. The foregoing operation is independent of the opened or closed position of a lighting switch X-9. The same result is also attainable by interposing said supervised lighting circuit between terminals X-5 and X-6.

FIG. 14 illustrates a supervisory circuit of the type referred to immediately above wherein four lighting circuits are interposed between terminals X-3 and X-4, as shown in FIG. 12. The lighting circuit fuses and lamp filaments are connected as shown in FIG. 14. If the supervised circuit is in a normal condition, transistor X-5 oscillates through a loop formed of the collector of transistor X-5, condenser X-4, fuse X-14, filaments X-18 and X-19, fuses X-15 and X-16, filaments X-20 and X-21, fuse X-17, transformer X-13, condenser X-3, and the base of transistor X-5. Choke coils X-6, X-7, X-8, X-9 and a first winding X-10 of transformer X-13 are interposed so as to present high impedance at the oscillator frequency, and to increase the impedance at the power source of said circuit. When transistor X-5 oscillates, only the high frequency components are passed by condenser X-23 and resistance X-24, and the passed signal is wave-detected by transistor X-27, and smoothed by condenser X-26, to light display lamp X-25. If the supervised circuit has a fault, for example, a filament burn-out, oscillation stops since the loop of oscillator is cut, so transistor X-27 is interrupted, and display lamp X-25 is not lighted. Condenser X-22 is interposed so that choke coil X-6 and the first-winding X-10 of the transformer to by-pass the supervised lighting circuit. When lighting circuit switches X-27, X-30 are turned on, the direct current resistance of choke coils X-6-X-9 and of the first winding X-10 of the transformer is so small that their voltage drop is negligible. The lighting circuit is, therefore, scarcely affected, and a high frequency loop is not formed. It is apparent that the foregoing circuit may be altered to supervise any number of circuits.

FIG. 15 shows another modification of the apparatus described immediately above. In this embodiment, four supervised lighting circuits are interposed between the terminals X-5 and X-6 shown in FIG. 12. When the supervised lighting circuit is in its normal condition, a loop is formed by the emitter of a transistor X-5', inductance X-31', condenser X-11', fuse X-12', filaments X-16' and X-17', fuses X-13' and X-14' filaments X-18' and X-19', fuse X-15', condenser X-3', and the base of transistor X-5', which transister X-5' oscillates. Choke coils X-6', X-7', X-8', X-9' and X-10' are interposed to provide high impedance at the oscillator frequency and to raise the impedance at the power source of the supervised circuit. When transistor X-5' oscillates, the high frequency oscillation is passed by a condenser X-4' and resistance X-20', and is wave-detected by transistor X-23', then smoothed by condenser X-22'. Thus the collector potential of transistor X-23' approaches ground potential and transistor X-26' is interrupted and accordingly, display lamp X-27' is not lighted.

When the supervised circuit has a fault and since the oscillation stops, transistor X-23' is interrupted; the collector potential rises, and transistor X-26' is rendered conductive and display lamp X-27' is lighted.

Condenser X-32 is interposed to pass the high frequency to ground and prevent choke coils X-6' and X-10' from being affected thereby. Even if lighting circuit switches X-29' and X-30' are closed, the lighting circuit is scarcely influenced just as the case of FIG. 14, and a loop is not formed by the normal d.c. operating current. The supervisory circuit thus operates independently of the on/off condition of the lamps. As with the aforedescribed embodiments, any number of lamp circuits may be supervised. Indicators other than display light may be employed.

FIG. 16 shows modified embodiment of that shown in FIGS. 14 and 15. FIG. 16 shows a supervised lighting circuit is utilized as a feed-back loop of an oscillator. Transistor X-1" oscillates through transformer X-5" when the supervised circuit comprising fuse X-8" and filament X-9" is in a normal state. At this time, if the primary side impedance of transformer X-5" is larger than the impedance of display lamp X-4", the display lamp X-4" is unable to be lighted. When the circuit has a fault, the feed-back loop of transistor X-1" is cut off and does not oscillate. Display lamp X-4" is lighted if resistance X-2" is selected so that transistor X-1" is conductive and providing that the direct current resistance of a first winding of transformer X-5" is selected smaller than that of the resistance of display lamp filament X-4".

When a plurality of supervised circuits are used, they should be connected as shown in FIGS. 14 and 15. As in the case of the embodiment of FIGS. 14 and 15 the supervisory operation is not influenced by the opened or closed condition of lighting switch X-11" and the influence of the impedance of the choke coil at low frequency or d.c. on the lighting circuit is negligibly small. Preferred embodiments of the type of supervisory circuit shown in FIG. 4 are illustrated in FIGS. 17 to 21. Circuit embodiments may be formed as two separate sections. Namely, a detecting section to detect if a supervised circuit is or is not in normal condition, and an indicating section to indicate the processed signal from said detecting section. Such a system has a drawback in that the apparatus is complex and is accordingly expensive.

To overcome such a drawback, the circuits of this invention include a feed-back circuit wherein a fault detecting section and an indicating section are provided with the same operating element. With such an arrangement, the apparatus is simplified and low priced. Furthermore, the circuit is supervised independently regardless of the on/off status of the supervised circuit. Thus, when the circuit has a fault, an indicator such as a display lamp, a relay, a buzzer, etc. can be operated to obtain the desired effect.

With reference to FIG. 17, Y-1 designates a high frequency oscillator having an indicator Y-11 such as a display lamp and Y-2 designates an element which has specified impedance at the oscillator frequency of oscillator Y-1. Element Y-4 is connected in series with a supervised lamp Y-3. Element Y-4 has a high impedance at the oscillator frequency and a sufficiently low impedance at the frequency of the power source of the supervised circuit. Condenser Y-12 is connected as shown in FIG. 17 and has a sufficiently low impedance at the oscillator frequency and a sufficiently high impedance at the frequency of the power source of the supervised circuit.

Supervised lamp Y-3 and condenser Y-12 have low impedance when the lamp Y-3 is in a normal condition, independently of the opened or closed state of lighting switch Y-9. The high frequency oscillator signal is divided of condensers Y-3 and Y-12. Accordingly, scarcely any high frequency is produced at connection point Y-10. When supervised lamp Y-3 is in an abnormal condition, such as caused by a burned-out filament, signal from high frequency oscillator Y-1 appears at connection point Y-10, if lighting switch Y-9 is opened. Even if switch Y-9 is closed, the signal is divided by elements Y-4 and Y-2 which have high impedance at the oscillator frequency and a high frequency is produced at connection point Y-10. Condenser Y-5 and impedance Y-6, extract this high frequency signal so it is wave detected by wave-detector Y-7 and smoothed in smoothing circuit Y-8. The output of smoothing circuit Y-8 is zero when the supervised lamp Y-3 is a normal condition, while a direct current is produced when the lamp Y-3 is in an abnormal condition. The direct current is fed back to the input of high frequency oscillator Y-1 so that sufficient current flows to operate load indicator Y-11. When the supervised lamp Y-3 is in a normal condition, th smoothed oscillator current is sufficiently small so as not to operate indicator Y-11.

With reference to FIG. 18, a high frequency oscillator is formed by inductance Y-1', condenser Y-2', resistance Y-3', display lamp Y-4', inductance Y-5' and transistor Y-6'. When supervised lamps Y-10' and Y-11' are in a normal condition, the high frequency signal is scarcely produced at connections Y-22' and Y-23'. Therefore, the potential at connection Y-24' is low and no feed-back occurs into the base of transistor Y-6'. If Y-1', Y-2' and Y-3' are suitably selected, transistor Y-6' oscillates intermittently with a high frequency. The average oscillator current is arranged to be small. In addition, by selecting inductance Y-5' having high impedance at the signal frequency operating display lamp Y-4', it will not be lighted, although a faint current flows in the filament of lamp Y-4'. Inductance Y-5' also increases the oscillator output voltage; the direct current resistance is, however, so small that no influence is given to lighting of the display lamp Y-4'. Accordingly, the display lamp Y-4' is not lighted when Y-10' and Y-11' are in a normal condition. However, if supervised lamp Y-10' is not normal, the high frequency voltage, which is divided by resistance Y-9' and choke coil Y-12', is produced at connection point Y-22', from which only the high frequency element is passed by condenser Y-14', and is level-shifted by diode Y-15', and integrated by resistance Y-18' and condenser Y-20', then the potential at connection Y-24' rises. The direct current potential is fed back through resistance Y-21' into the base of transistor Y-6'. Transistor Y-6' conducts and sufficient current flows into display lamp Y-4' so as to light it.

When transistor Y-6' is non-conductive, oscillation stops. Consequently, the high frequency signal at connection Y-22' is reduced. Since the charge stored in condenser Y-20' is discharged through resistance Y-21', the potential at connection Y-24' is gradually reduced. Transistor Y-6' oscillates again and display lamp Y-4' goes out, and the potential at Y-24' gradually rises causing transistor Y-6' to be conductive. The cycling of transistor Y-6' causes display lamp Y-4' to flash with a time interval set by the charging and discharging of condenser Y-20'. This applies to both cases when either or both supervised lamps Y-10', Y-11' have a fault. Condensers Y-7', Y-14' and Y-16' are used for isolating direct current when the supervised circuit is on. Condenser Y-20' has the purpose of integrating, together with resistances Y-18' and Y-19', and also of separating Y-10 from Y-11 in relation to the high frequency signal to prevent them from influencing each other. When the time constant is small in this integration circuit, the conduction and oscillation cycles of transistor Y-6' is highly repetitive, but display lamp Y-4' is lighted.

FIG. 19 shows a more simplified embodiment of that shown in FIG. 18. Corresponding elements of FIGS. 18 and 19 have the same reference designations. Condensers Y-7, Y-9, Y-14 and Y-16 are selected to have a certain impedance, and also serve to isolate direct current and the operation of the circuit is the same as that of FIG. 18.

FIG. 20 shows an embodiment in which choke coil Y-11 and Y-12 are connected with supervised lamps Y-9 and Y-11, respectively, and, lamps Y-9 and Y-10 are connected in series in relation to the high frequency signal. The operation of the circuit is the same as that of FIG. 18.

FIG. 21 shows an embodiment in which diode Y-17, shown in FIG. 19, is replaced by transistor Y-23. When supervised lamps Y-10 and Y-11 are in a normal condition, transistor Y-23 is interrupted by means of resistance Y-26. Accordingly, the collector potential decreases to zero, and no feedback occurs into transistor Y-6. When Y-10 or Y-11 is not in a normal condition, a direct current voltage is fed back from the collector of transistor Y-23 through an integrating circuit, formed by resistors Y-29, Y-21 and condenser Y-20, into the base of transistor Y-6, and by which display lamp Y-4 is lighted or flashed. The respective embodiments shown in FIGS. 18 to 21 may also be used to supervise any number of lights.

As described above with reference to the other embodiments, the circuits illustrated in FIGS. 18–21 will operate independently of the on or off condition of the supervised circuit, and indicators such as a display lamp, a relay, a buzzer can be operated thereby. Furthermore, the circuittry is very simple and inexpensive since a single transistor is used for both a high frequency oscillator and to initiate the indicator operation.

In supervisory apparatus for lighting circuits using many incandescent lamps, indicators such as display lamps are used proportionately. Consequently, there arises a need to check or supervise such indicators themselves to see if they are working normally as well as to ascertain the condition of the detection circuit itself. To meet such a need, this invention provides apparatus which indicates not only faults in the supervised lighting circuit, but also indicates malfunctions or faults in supervisory circuits as well.

With reference to FIG. 22, Z-1 designates a switch of the supervised lighting circuit; Z-9, Z-10 and Z-11 are supervised lamps; and inductance Z-12, condenser Z-13, resistances Z-14, Z-15 and transistor Z-16 form a high frequency oscillator. Condensers Z-2, Z-3, Z-4 and Z-5 have low impedance at the oscillator frequency and have high impedance at the frequency of the power source of the supervised lighting circuit. Choke coils Z-6, Z-7 and Z-8 have high impedance at the oscillator frequency and low impedance at the frequency of the power source. Condensers Z-17, Z-19 and Z-21 have low impedance at the oscillator frequency, and steer the high frequency signal to the circuits comprising resistances Z-18, Z-20, Z-22 and supervised lamps Z-9, Z-10, Z-11. The signals which are divided by resistances Z-18, Z-20, Z-22 and by lamps Z-9, Z-10, Z-11 are then fed through condensers Z-23, Z-24 and Z-25, and level-shifted by diodes Z-26, Z-27 and Z-28. This level shifting may be replaced by wave-detection. The shifted signal is supplied to the base of transistor Z-25, and transistor Z-35 conducts irrespective of the on or off state of the supervised circuit providing the circuit is in a normal condition. Consequently, since transistor Z-41 is interrupted, guard lamp Z-42 is not lighted.

If one or more of the supervised lighting circuits Z-9, Z-10 and Z-11 has a fault, guard lamp Z-42 is lighted since the transistor Z-35 is interrupted and transistor Z-41 is conducting. To use many supervised lighting lamps, circutiry in accordance with that described above up to the guard lamp would be parallel. For example, Z-38 includes all the circuitry from the detection circuit to transistor Z-35.

Diodes Z-46, Z-47, Z-48, Z-52, Z-53, Z-54, Z-55, Z-56 and resistances Z-49, Z-50, Z-51 form an OR circuit. When both the supervised lamps and the guard lamp are in a normal condition, transistor Z-59 is conductive. And if one or more among both kinds of lamps above has a fault, transister Z-59 is interrupted. When the high frequency oscillator ocillates normally, transister Z-67 conducts by means of a smoothing circuit formed of condenser Z-61, diode Z-62 for level shifting, resistance Z-63, and condenser Z-64. When the high frequency oscillator stops or when a fault occurs, transistor Z-67 is interrupted. When the signal from transistors Z-59 and Z-67 is ORed by diodes Z-69 and Z-70, if all the circuitry is in a normal condition, then transistor Z-74 is interrupted. Accordingly, transistor Z-78 conducts and a pilot lamp Z-79 is lighted.

When a supervised lamp is in a normal condition, and one or more lamps among the display lamps has a fault, pilot lamp Z-79 goes out to indicate there is trouble in the circuit. When one or more lamps among the supervised lamps has a fault, a corresponding guard lamp is lighted and the pilot lamp Z-79 goes out. If the pilot lamp Z-79 is lighted, all the circuits are in a normal condition. But if the pilot lamp goes out, some trouble has occurred (either in the supervised lamp circuitry or the detection circuitry, or both circuits.

If pilot lamp Z-79 is used below its rated voltage so as to lengthen its life, the probability of its burning out will be lessened. When a switch Z-80, such as a push button, is turned on, transistor Z-78 is turned on through diode Z-81 and resistance Z-80, Z-82, and pilot lamp Z-79 is lighted. At the same time, by means of diode Z-83, resistance Z-84 and transistor Z-41, guard lamps Z-42, and Z-44 are lighted. Thus, by the process of checking guard lamps, display lamps, and so on using switch Z-80, safety supervision is further assured. Pilot lamps and guard lamps may be located remotely from the supervised lamps and it is also possible to transmit the data from a remote location using a relay, a transistor driver or by wireless or wire relaying such as telephone lines. Thus, the aforedescribed comprises an oscillator having a frequency different from that of the power source of the supervised lighting circuit, and characterized by the following: Electrical elements having a high impedance at the oscillator frequency are connected in series with said supervised lighting circuit; the oscillator output is supplied into the supervised lighting circuit; normality or abnormality in the supervised lighting circuit is detected by whether high frequency voltage is produced or not; and the condition of the indicators and said oscillator is also indicated. In the aforedescribed apparatus, the oscillation of the high frequency oscillator is important and by supervising the oscillation, it can be easily confirmed if the circuits work normally or not. Furthermore, guard lamps and so on are checked by a simple switch. Thus the reliability is much improved.

What we claim is:

1. Monitoring apparatus for lighting circuits, comprising:
   a power source for said lighting circuits;
   oscillating means having an oscillating frequency output higher than the frequency of said power source;
   inductor means connected in series with said lighting circuits and said power source;
   said means for oscillating being non-inductively coupled to a junction of said inductor means with said lighting circuit through an impedance;
   means for detecting failure of at least one of said monitored lighting circuits by detecting the presence of said oscillating frequency output at said junction, said means for detecting including means for rectifying said oscillating frequency output; and
   means for indicating the presence of said oscillator output, whereby a failure of said lighting circuits is determined.

2. Monitoring apparatus as in claim 1 wherein said means for oscillating includes a blocking oscillator, and said means for detecting includes a first circuit having an integration time constant whereby said means for indicating is continuously activated by a fault in at least one of said lighting circuits, and further including a second detecting circuit having an integration time constant sufficiently less than the period of said oscillating frequency output whereby said means for indicating is intermittently actuated at the frequency of said blocking oscillator with at least another of said lighting circuits inoperative.

3. Detection apparatus as in claim 1 wherein at least one of said lighting circuits is a headlamp circuit, at least another one of said lighting circuits is a passing-beam circuit; and further comprising switching means responsive to said means for detecting to actuate said means for indicating with at least one headlamp circuit inoperative, said switching means actuating said at least one passing-beam circuit with said at least one headlamp circuit inoperative, said switching means also actuating other ones of said lighting circuits with said at least one headlamp passing-beam circuit inoperative, and said switching means actuating said means for indicating with said lighting circuits other than said headlamp and said passing-beam circuits inoperative.

4. Monitoring apparatus as in claim 1 further comprising a transistor common to said means for oscillating and said means for indicating, and having an input and an output; at least one display lamp connected as a load to said means for oscillating; the output of said means for rectifying being connected to the input of said transistor and the output of said transistor actuating said display lamp at a frequency determined by the time constant of said means for rectifying.

5. Monitoring apparatus as in claim 1 wherein said means for indicating includes an alarm actuated with at least one of said lighting circuits inoperative and said alarm is also actuated with a failure of said means for oscillating.

6. Monitoring apparatus as in claim 1 further comprising switching means for checking the operation of said means for indicating by connecting said oscillator output to said means for indicating.